Jan. 3, 1956 P. A. CASTRUCCIO 2,729,792
MODULATORS
Filed Feb. 12, 1953

INVENTOR.
PETER A. CASTRUCCIO
BY Billy J. Corber 2,729,792
Patented Jan. 3, 1956

2,729,792

MODULATORS

Peter A. Castruccio, Baltimore, Md., assignor to Aircraft Armaments, Inc., Baltimore, Md., a corporation of Ohio Application February 12, 1953, Serial No. 336,483

4 Claims. (Cl. 332—37)

This invention relates in general to modulators and more particularly to an amplitude modulator for modulating pulsed R. F. energy.

The principal use of modulators for modulating pulsed R. F. energy is found in signal generators and other test equipment for checking the operation of beam riding missile systems. The signal generator emits R. F. pulses at a known phase, amplitude and repetition rate whereby the missile system is caused to respond to the R. F. pulses in a manner which may be compared with a known proper response as determined by the phase, amplitude and repetition rate of the radar. As so used in test equipment, the R. F. modulator must obviously be dependable and accurate in its operation. The phase of the modulated R. F. signal must be closely controlled so as not to shift relative to the phase of the modulating signal.

The high frequency energy of the R. F. pulses is not susceptible to modulation in the lower frequency manner but requires methods and apparatus quite different from those conventionally employed. It has also been found that known stabilizing systems are not adaptable to modulators for modulating pulsed R. F. energy since conventional feedback of pulsed R. F. energy will itself introduce phase shifting due to the discrete nature of the phase information derived from a pulsed signal.

The principal object of this invention is to provide an amplitude modulator for pulsed R. F. energy having a reduced overall phase shift of the modulated R. F. signal.

Another object of this invention is to provide a simple and dependable stabilizing feedback system particularly adapted for R. F. modulators of the type used in modulating pulsed R. F. energy.

Further and other objects will become apparent from the following description when taken in conjunction with the accompanying drawings wherein like numerals refer to like parts.

Figure 1:
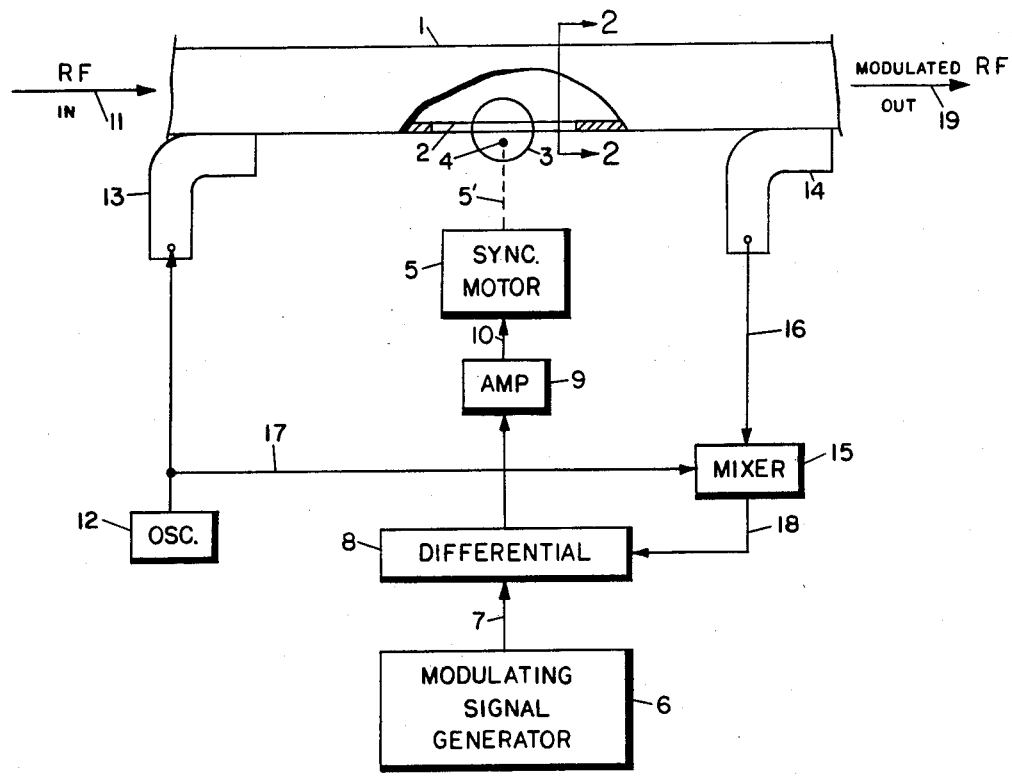
Figure 1 is a schematic view of the modulator feedback system of this invention.
Figure 2:
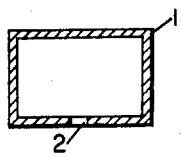
Figure 2 is a section taken on line 2—2 of Figure 1.

As shown in Figure 1, the R. F. modulator includes a generally rectangular waveguide section 1 having a slot 2 formed in one side thereof. A conventional dipping card 3 having absorbing material on the exterior thereof is arranged to be received by slot 2 and rotate about an axis 4 offset from the center of the dipping card so that the card will extend into the waveguide a varying amount as the card is rotated whereby R. F. energy within the waveguide is amplitude modulated.

A synchronous motor 5 controls the rotation of card 3 through shaft 5' and is driven by a modulating signal generated by signal generator 6. The output of the signal generator is fed into an electrical differential 8, modified therein as hereinafter described, and amplified in amplifier 9. The output 10 of amplifier 9 is connected to motor 5 completing a circuit from signal generator 6 to the synchronous motor.

The pulsed R. F. energy to be modulated is fed into waveguide 1 ahead of dipping card 3 as indicated by arrow 11. The R. F. energy passes through the waveguide and is amplitude modulated by dipping card 3 at a modulation frequency proportional to the rotational speed of shaft 5 and travels on through the waveguide after modulation as indicated by arrow 19. Though it is desirable that the modulated R. F. signal be in a fixed phase relationship with the modulating signal from signal generator 6 without the feedback system hereinafter described, phase shifting unavoidably occurs through imperfect operation of amplifier 9 and synchronous motor 5.

To eliminate or substantially reduce phase shifting of the modulated R. F. signal, an oscillator 12 is provided which generates a continuous wave signal at a frequency different from the frequency of the R. F. signal by an amount sufficient to prevent the oscillator signal from affecting the apparatus responsive to the modulated R. F. signal. The continuous wave signal is fed into waveguide 1 ahead of dipping card 3 through an R. F. coupler 13. The continuous wave signal is modulated along with the R. F. signal by dipping card 3 and recovered after modulation by an R. F. coupler 14. The modulated continuous wave signal from R. F. coupler 14 is fed to a mixer 15 through lead 16. The unmodulated continuous wave signal produced by oscillator 12 is also fed to mixer 15 through lead 17 wherein the modulated and unmodulated continuous wave signals are operated on to provide an output 18 from mixer 15 representing the envelope of the modulated continuous wave signal which is identical to the envelope of the modulated R. F. signal. Output 18 is fed to differential 8, inverted and combined with the modulating signal from signal generator 6 to modify the signal going to amplifier 9 so as to correct for any phase shift detected between mixer output 18 and the output from signal generator 6. Thus any phase shifting which might occur in the modulator is automatically corrected to maintain the modulated R. F. signal in a fixed phase relationship with the modulating signal.

In operation, the R. F. signal to be modulated is fed into waveguide 1. The modulating signal from signal generator 6 drives motor 5 which causes dipping card 3 to rotate about axis 4 so as to extend into the waveguide in a varying and cyclical manner. A continuous wave signal from oscillator 12 is fed into waveguide 1 so that both the continuous wave signal and the pulsed R. F. signal are modulated in like manner by dipping card 3. The modulated R. F. pulses pass on through the waveguide. The modulated continuous wave signal is recovered through R. F. coupling 14 and mixed with the unmodulated continuous wave signal in mixer 15 to produce a feedback signal representing the envelope of the modulated signal. The feedback signal from mixer 15 is compared with the modulating signal in differential 8 to produce an output for driving motor 5 which automatically corrects for phase shifting introduced by imperfect operation of any component of the modulator including the motor.

Though a specific embodiment of the invention has been shown and described, it is to be understood that certain modifications, substitutions and alterations may be made without departing from the spirit and scope of the appended claims.

I claim:

1. A modulator for modulating a pulsed radio frequency signal comprising, a waveguide through which said pulsed radio frequency signal is fed, modulating means including a movable attenuator, said waveguide having a slot formed therein receiving said movable attenuator for amplitude modulating electrical energy within said waveguide, oscillating means generating a continuous wave signal at a frequency different from the frequency of said pulsed radio frequency signal, means feeding said continuous wave signal into said waveguide ahead of said slot and extracting said continuous wave signal after said slot as a modulated continuous wave signal, mixer means connecting with said last mentioned means and responsive to said modulated continuous wave signal to produce a signal representing the envelope of the modulated continuous wave signal, and feedback means connecting with said modulating means and responsive to the output from said mixer means for stabilizing said modulating means and reducing overall phase shift of the modulated radio frequency pulses.

2. An amplitude modulator for modulating a pulsed radio frequency signal comprising, an energy transmission line carrying said pulsed radio frequency signal, oscillating means connecting with said transmission line and generating a continuous wave signal at a frequency different from the frequency of said pulsed radio frequency signal and introducing said continuous wave signal into said transmission line, means generating a modulating signal, amplitude modulating means connecting with said transmission line and responsive to said modulating signal for amplitude modulating both said pulsed radio frequency signal and said continuous wave signal, mixer means connecting with said transmission line and responsive to the modulated continuous wave signal and to the unmodulated continuous wave signal from said oscillating means and having an output signal at a frequency equal to the modulation frequency of said modulated continuous wave signal, and feedback means connecting with said modulating means and responsive to said mixer means for stabilizing said modulating means whereby to reduce overall phase shift of said modulated radio frequency signal.

3. A modulator for modulating a pulsed radio frequency signal comprising, an energy transmission line carrying said pulsed radio frequency signal, an oscillator connecting with said transmission line and generating a continuous wave signal at a frequency different from the frequency of the radio frequency signal, a modulating means connecting with said transmission line and modulating said pulsed radio frequency signal and said continuous wave signal, and feedback means connecting with said transmission line and with said modulating means and responsive to the modulated continuous wave signal for phase stabilizing the modulated radio frequency signal.

4. An amplitude modulator for modulating a pulsed signal comprising, a transmission line carrying said pulsed signal, oscillating means connecting with said transmission line and generating a continuous wave signal at a frequency different from the frequency of said pulsed signal and introducing said continuous wave signal into said transmission line, means generating a modulating signal, amplitude modulating means connecting with said last mentioned means and responsive to said modulating signal for amplitude modulating both said pulsed signal and said continuous wave signal, mixer means connecting with said transmission line and responsive to the modulated continuous wave signal and to the unmodulated continuous wave signal from said oscillating means and having an output signal at a frequency equal to the modulation frequency of said modulated continuous wave signal, and feedback means connecting with said mixer means and responsive to said mixer output signal for stabilizing said modulating means whereby to reduce overall phase shift of said pulsed signal.

References Cited in the file of this patent

UNITED STATES PATENTS

| | | |
|---|---|---|
| 2,298,930 | Decino | Oct. 13, 1942 |
| 2,338,512 | Harmon | Jan. 4, 1944 |
| 2,505,557 | Lyman | Apr. 25, 1950 |